United States Patent [19]

Föhl

[11] Patent Number: 4,475,779
[45] Date of Patent: Oct. 9, 1984

[54] ROTARY ELECTRICAL CONNECTION

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 359,528

[22] Filed: Mar. 18, 1982

[30] Foreign Application Priority Data

Mar. 19, 1981 [DE] Fed. Rep. of Germany ....... 3110815

[51] Int. Cl.$^3$ ............................................ H01R 39/00
[52] U.S. Cl. .................................... 339/5 M; 339/35; 339/6 R; 339/8 PB
[58] Field of Search ............... 339/3 R, 3 S, 5 R, 5 M, 339/5 P, 6 R, 8 R, 8 PB, 10

[56] References Cited

U.S. PATENT DOCUMENTS

| | | | |
|---|---|---|---|
| 2,474,070 | 6/1949 | Sokolik | 339/8 PB |
| 2,523,081 | 9/1950 | Wendt | 339/5 M |
| 2,790,152 | 4/1957 | Mohr | 339/8 PB |
| 3,089,113 | 5/1963 | Mohr | 339/8 PB |
| 3,501,204 | 3/1970 | Schreffler | 308/1 R |
| 3,876,272 | 4/1975 | Tsutsumi et al. | 339/3 S |
| 4,006,954 | 2/1977 | Ikawa et al. | 339/8 R |
| 4,063,789 | 12/1977 | Kreisl | 339/3 S |
| 4,157,854 | 6/1979 | Beauch | 339/3 S |

FOREIGN PATENT DOCUMENTS 7204100  4/1972  Fed. Rep. of Germany .
961224   1/1949  France .................................. 339/5 P Primary Examiner—Eugene F. Desmond
Assistant Examiner—Steven C. Bishop
Attorney, Agent, or Firm—Yount & Tarolli

[57] ABSTRACT

Device for the electrical connection of at least two structural elements, preferably of annular shape, which are arranged on a common axis and are rotatable with respect to each other, which form contact elements and are provided with electrical connecting elements, and between which conducting rolling bodies are arranged serving as electrical connection-elements against which said contact elements are braced, and at least one spring- or pressure element is provided, by which the contact elements are permanently in contact with the rolling bodies by a mechanical preload.

4 Claims, 8 Drawing Figures

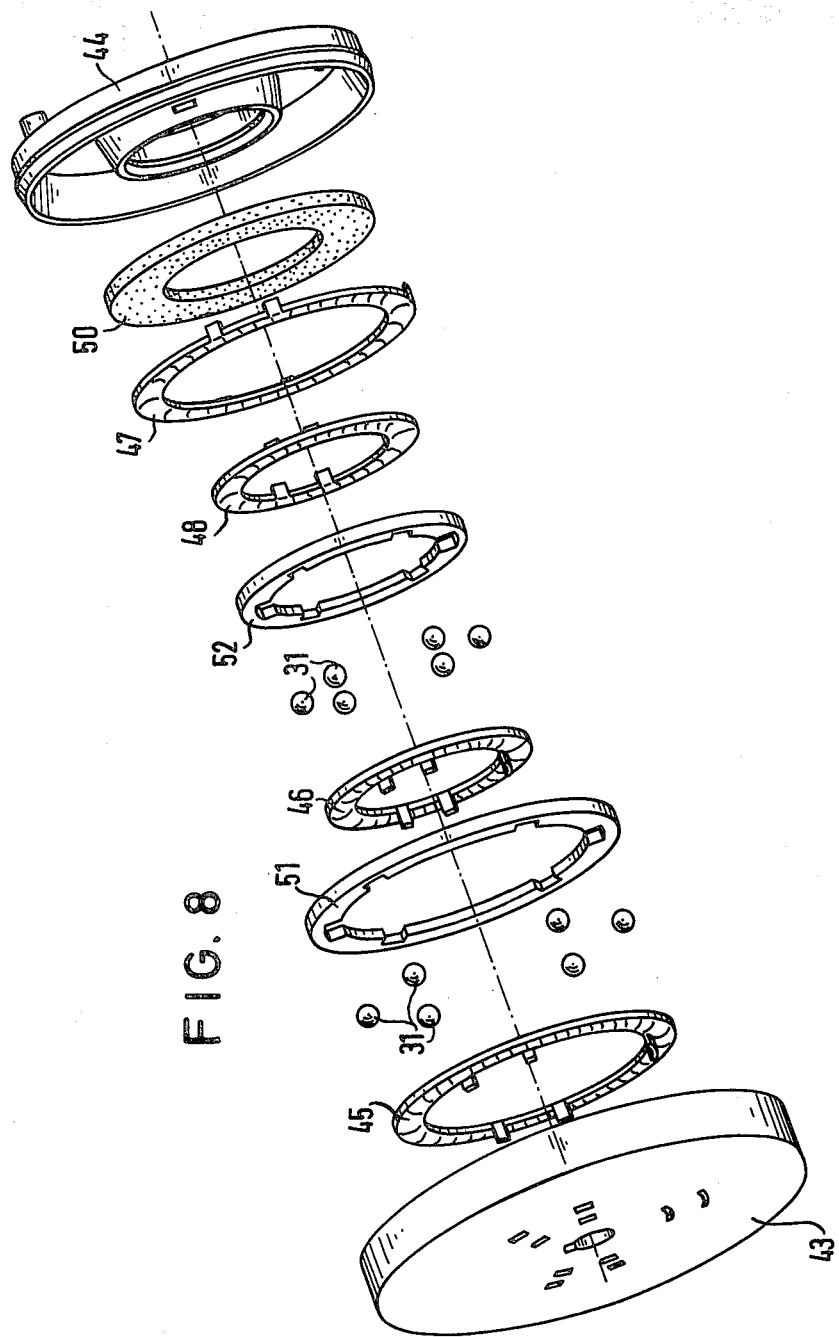

ROTARY ELECTRICAL CONNECTION

CROSS-REFERENCE TO RELATED APPLICATION

My application Ser. No. 359,529, filed Mar. 18, 1982 and entitled "Apparatus for Providing a Reliable Electrical Connection".

BACKGROUND OF THE INVENTION

1. Field of the Invention

The invention relates to a device for the electrical connection of at least two structural elements, preferably of annular shape, which are arranged on a common axis and are rotatable with respect to each other.

2. Description of the Prior Art

At a known rotating electrical contact (German Gebrauchsmuster Pat. No. 72 04 100) an antifriction bearing is provided, whose inner ring and outer ring each have an electrical connection, the antifriction bearing is axially loaded and its inner ring at the bore-side and its outer ring at its circumference are provided with an electrically insulating layer. The rolling elements which are made of an electrically conducting material, in the form of balls retained in a cage, are in contact at one side with an inner ring having an essentially axial running track, and at the other side contact an outer ring which is also provided with an essentially axial running-ring. Due to the axial force which acts obliquely through the bearing, a reliable contact is established between all rolling elements and the two metallic tracks, so that a transfer of electric current is assured at all times. By generating an axial force in this manner, additional provisions are not required to keep the two bearings in contact with the rolling elements. The intimate contact between the mentioned parts of the electrical connecting device resulting in low transfer resistances, is thereby dependent on the presence of a force in the axial direction which, however, is not available in many cases or only present temporarily. The result is that, at least temporarily, very high transfer resistances exist due to a poor contact closure so that the application of the known device is not suitable, for example, in such cases where only a very small current of a few $m^A$ flows through the contact parts, such as for control purposes. Such a case exists at a safety system in a motor vehicle wherein an inflatable bag is disposed at the steering wheel, whose inflation-ignition mechanism is electrically activated, and must be in connection with a chassis-fixed crash-sensor through electrical connecting lines. Here, the operating reliability of the safety system must at all times be assured.

SUMMARY OF THE INVENTION

An object of the present invention is to provide a device for the electrical connection of at least two structural elements which are arranged on a common axis and are rotatable with respect to each other such that a uniform, reliable electrical connection is assured between the structural parts rotatable against each other, with low transfer resistance and also good wearproof properties.

With the foregoing and other objects in view, there is provided in accordance with the invention a device for an electrical connection which comprises at least two structural elements which are arranged on a common axis and are rotatable with respect to each other, said structural elements having contact elements and provided with electrical connecting elements, electrically conducting rolling bodies serving as electrical connection-elements arranged between said contact elements of said two structural elements, and braced against the contact elements, and at least one spring-or pressure element effecting a mechanical preload by which the contact elements are permanently in contact with the rolling bodies.

Other features which are considered as characteristic for the invention are set forth in the appended claims.

Although the invention is illustrated and described herein as embodied in a device for electrically connecting at least two structural elements which are arranged on a common axis and rotatable with respect to each other, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 8 is an exploded view of the device according to FIG. 6.

DETAILED DESCRIPTION OF THE INVENTION

Figure 1:
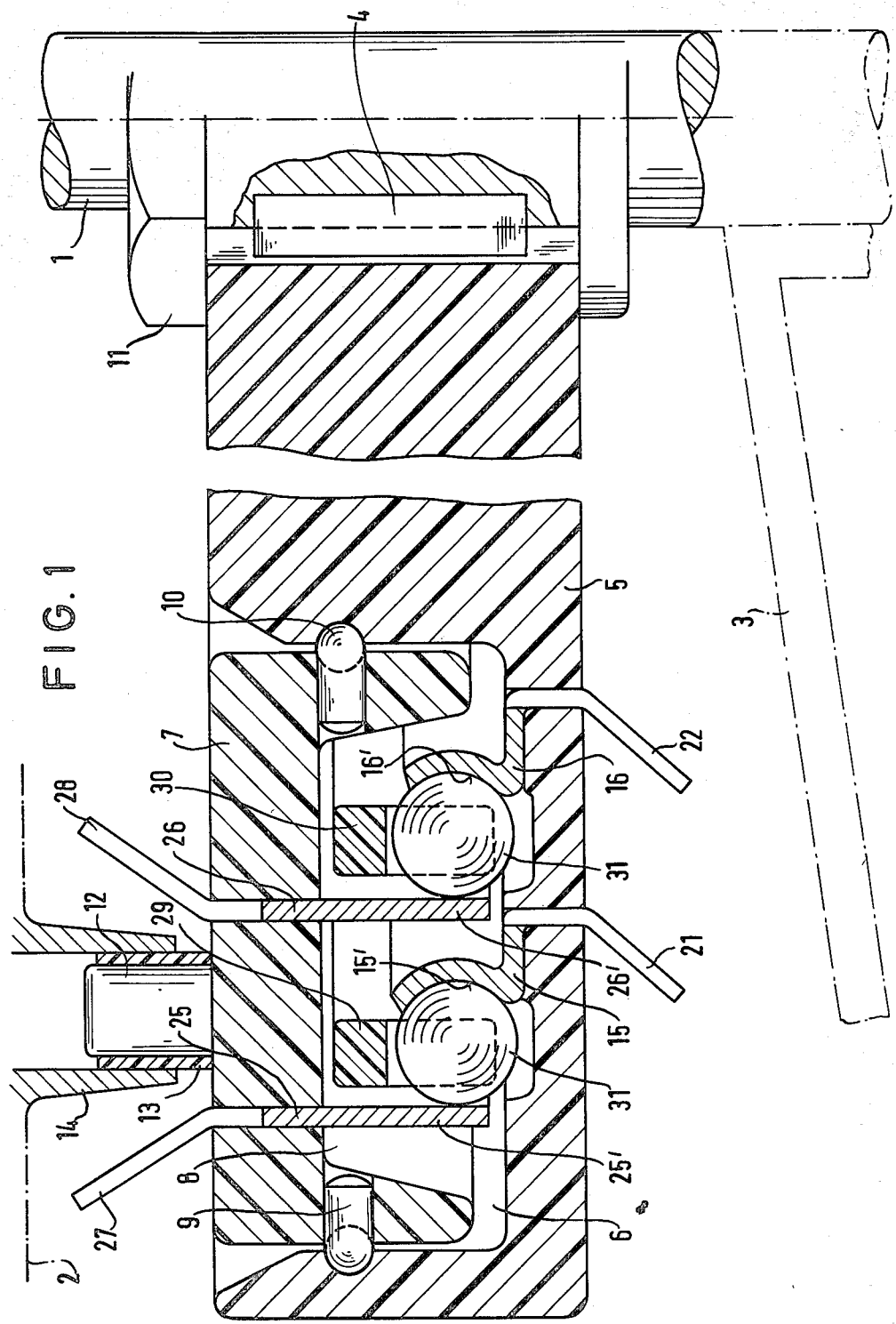
FIG. 1 is a partial-sectional view of the device according to the invention with radial preloading of the rolling elements, secured to the steering shaft of a motor vehicle.

In accordance with the invention at least one spring- or pressure element (contact elements 25, 26; 33; 50; 57, 58) is provided, by which the contact elements (25,26) are permanently in contact with the rolling bodies (31) by a mechanical preload.

The use of rolling bodies in connection with contact elements with rubbing contact tracks, and also the continuous mechanical preloading of the before-mentioned parts, makes certain that the electrical connection of one or several current circuits is practically without wear, and provides at all times a good electrical contact with a very low transfer resistance. According to a preferred embodiment of the invention, the ring-shaped contact parts having different diameters are radially pressed against each other with the rolling bodies interposed between them. In this manner, a very flat construction of the device according to the invention becomes possible. In one embodiment of the invention, a ring-shaped circular contact ring is resiliently deflected to a noncircular or polygonal configuration by engagement by the rolling bodies to enable the resiliently deflected contact ring to continuously press the rolling bodies against another contact ring with a force which is substantially constant throughout the extend of an annular array of rolling bodies. In this way, a spring element is produced by simple means, which element does not have the disadvantage of the conventional spring elements, i.e. a slow weakening of the spring force. By virtue of the special shape of the ring-shaped spring element alone, the electrical connection is mechanically preloaded at rest as well as during the rolling motion, so that a reliable electrical contact between the above-mentioned parts is assured at all times.

The invention is further explained by typical embodiments shown in the drawings.

Figure 2:
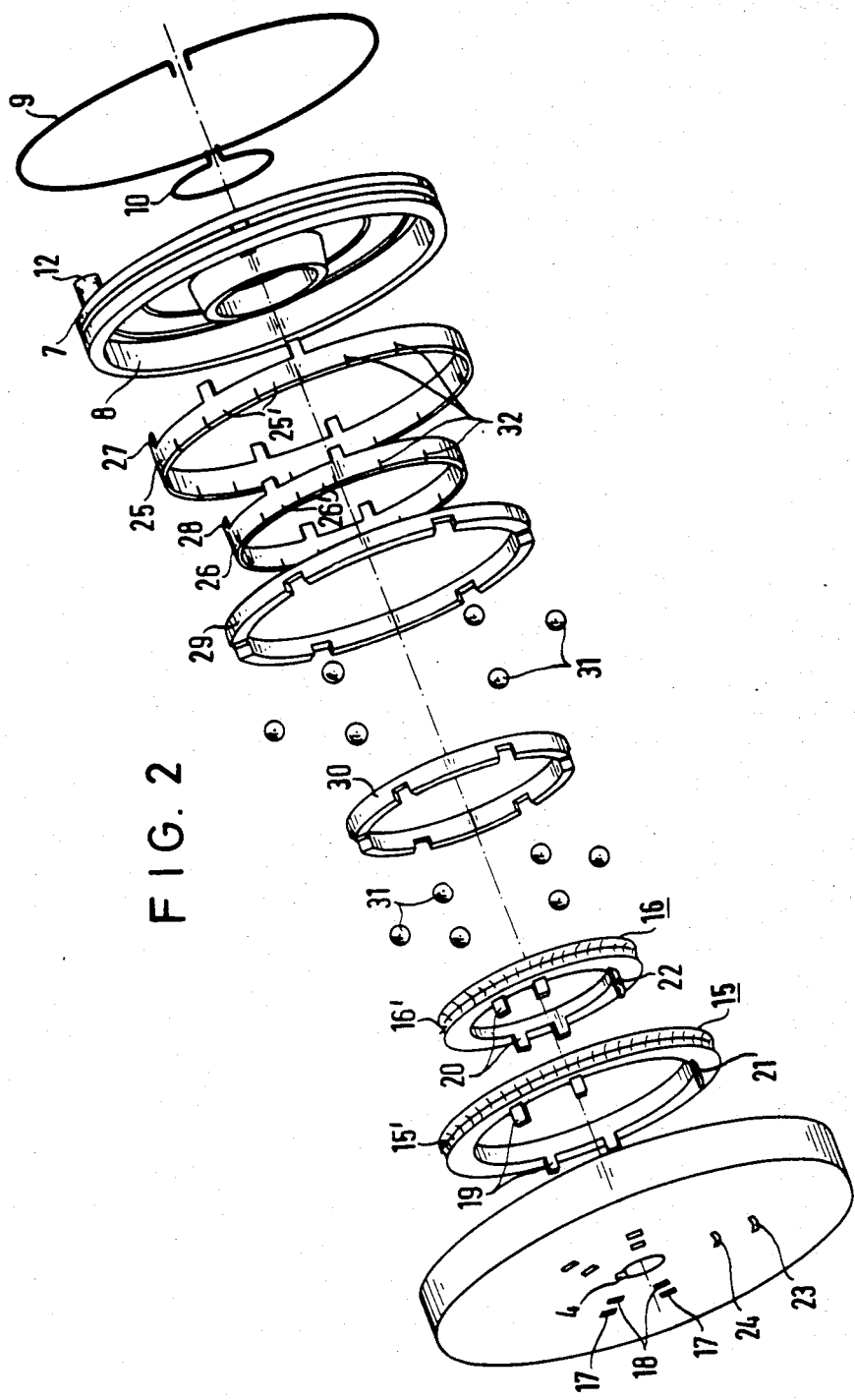
FIG. 2 is an exploded view of the device according to FIG. 1.

In the typical embodiment according to FIGS. 1 and 2, is shown a steering shaft 1 of a motor vehicle, which is not further shown, to which at a distance from the vehicle-chassis at the driver side, a steering wheel is fixedly attached, indicated by dash-dot lines. Also fixedly attached at the steering shaft 1, for example by means of a drive key 4, is a circular support plate 5 made, for example, of insulating plastic. Plate 5 is provided with a recess 6 which is concentric to the steering wheel axis. An annular cover-ring 7 is formed, for example, from an elastic synthetic material. This cover-ring 7 also has a ring-shaped recess 8, and can be fittingly inserted into the recess 6 of the support plate 5 and can be retained within the support plate 5 by two spring rings 9, 10 which have different diameters. The support plate 5 is fastened to the steering shaft by means of nut 11. The cover-ring 7 is provided with at least one pin-like coupling element 12, which is coupled indirectly through a damping bushing 13 to a corresponding pin-like protrusion 14 of the motor vehicle chassis 2. In the recess 6 in the support plate 5 are disposed two annular contact elements 15 and 16 each of which is provided with four support lugs 19, respectively 20, which can be inserted and retained in slots 17, respectively 18 of the support plate 5. Each contact element 15 and 16 is additionally provided with a lug-like electrical connection element 21, respectively 22. Each lug projects into an additional slot 23, 24 in the support plate, and serves to make contact with an electrical conductor, or electrical element which is not further shown. As FIG. 1 shows, the connection elements 21 and 22 are slightly bent after they are assembled. In a similar manner, the cover ring 7 carries two annular contact elements 25 and 26, which are concentric to each other, with corresponding support lugs, and electrical connection elements 27, 28, which in the same manner are fixed in corresponding slots in the cover ring 7. The contact elements 15 and 16 which are electrically insulated from each other, are provided with concave rubbing contact tracks 15' and 16' in the radial direction. Two radial ball-cages of different diameters designated 29 and 30, have disposed therein rolling bodies 31 in the form of balls. The rolling bodies 31 are arranged, respectively tensioned between the bearing ends of the contact elements 15 and 25, respectively 16 and 26, which face each other, i.e. between the rubbing contact tracks 15', 16' of the contact elements 15, 16, and the sleeve-like ends of the contact elements 25 and 26. The elastic tensioning of the above-mentioned contact elements with the rolling bodies between them is effected in the embodiment according to FIGS. 1 and 2 in the radial direction by providing the sleeve-like portions of the annular contact elements 25 and 26 around their circumference with springy segment tongues 25', respectively 26', which are separated by slots 32. The tongues press the rolling bodies 31 against the associated rubbing contact tracks 15' and 16'. The division of the segment tongues at the circumference of the annular contact elements 25, 26 is made different than the distribution of the rolling bodies. Thus, the contact elements 25, 26 provided with electrical connection elements 27 and 28, serve as spring-elements for tensioning the rolling bodies 31, and simultaneously serve as the contacting means.

Figure 4:
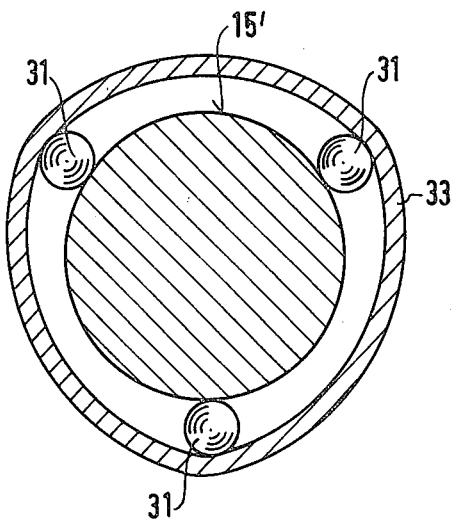
FIG. 4 is a schematic representation of the preloading system of the device according to the invention.

FIG. 4 shows an alternate embodiment form of a spring element 33 for the rolling bodies 31, which are pressed by said spring element 33 with a continuous preload against a rubbing contact track, for example, 15'. In contrast to the embodiment according to FIGS. 1 and 2, the ring-shaped spring element 33, for example having an electrical connection element, has an outer circumference which is smaller than the outer, theoretical race-diameter of the rolling bodies 31, in such a manner that the spring element 33 takes a polygonal shape, and is continuously polygonally deformed during the rolling motion, i.e. at the displacement of the spring element 33 relative to the rubbing contact track 15'. The polygonal shape of the spring element 33 is exaggeratedly shown in FIG. 4. In actuality, the outer circumference of the spring element 33 is only a little smaller, for example, a few 1/10 millimeter than the theoretical running-circle circumference of the rolling bodies 31. In any case, the rolling bodies are in this manner continuously preloaded against the rubbing contact rack 15', so that between the electrically acting contact elements 15 and 25, respectively 16 and 26, according to FIGS. 1 and 2, a uniformly good electric contact is established through the rolling bodies 31 without a transfer resistance worth mentioning.

Figure 3:
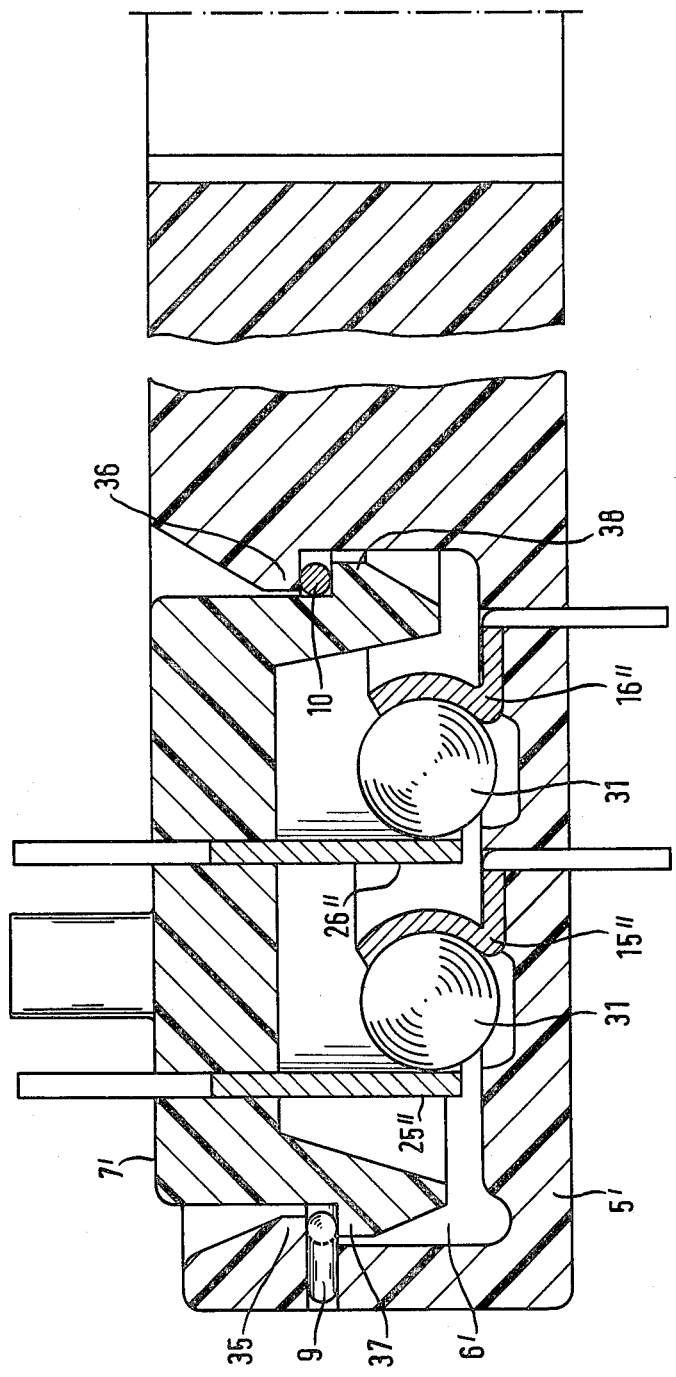
FIG. 3 is another embodiment form of the device according to the invention with radially preloaded rolling elements.

A difference between the embodiment according to FIGS. 1 and 2 and the embodiment according to FIG. 3 is the feature that detention rims 35 and 36 are provided at the inner and outer annular edges of the support plate 5', which protrude into the recess 6'. Correspondingly, the annular cover ring 7' has detention edges 37 and 38, which extend outwardly, respectively inwardly, which through the interposition of the spring rings 9, 10 engage with each other. This is made possible by the fact that the cover ring 7' consists of an elastic material so that the detention edges 37 and 38 can be deformed by pressure, whereafter the parts 5' and 7' are, by a snap-connection, joined to each other such that they can be rotated with respect to each other, as is also the case at the embodiment according to FIGS. 1 and 2. A further difference compared to the embodiment according to FIGS. 1 and 2, lies in the feature that, at the arrangement for the electric connection according to FIG. 3, the rolling bodies 31 are not retained in cages, but are freely pressed against the rubbing contact tracks of the opposing contact elements 15" and 16", by the spring action of the contact elements 25", respectively 26". In contrast thereto, at the embodiment according to FIGS. 1 and 2, the rolling bodies are retained in cages, so that they can slide in the radial direction.

The devices described with the aid of FIGS. 1–4 serve for the electrical connection between electrical elements or structural parts which are rigidly connected to the chassis of a motor vehicle, and between electrical elements or electrical structural parts which are directly or indirectly connected to the rotatable steering shaft 1, for example elements arranged at the steering wheel 3.

Figure 5:
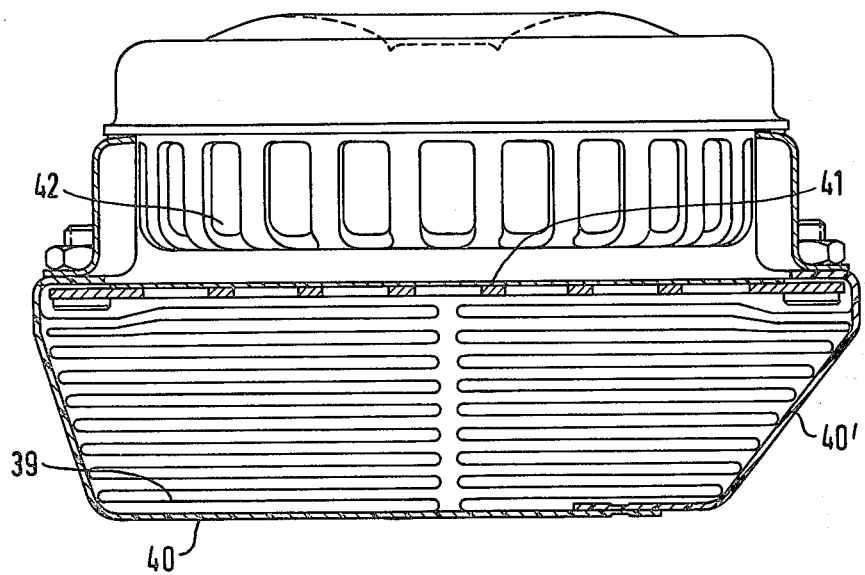
FIG. 5 is a side view in partial section of a safety device.

FIG. 5 shows as an example, an electrically operable safety device for impact protection for the vehicle passengers which is mounted in the center of the steering wheel. This safety device consists of a folded air bag 39, which is contained in the folded state between two cover shells 40 and 40'. These cover shells are attached by thin hinges at the side edges of a base plate 41. An actuator 42 is in the form of an electrically ignited pyrotechnical charge. By the above-described device for the electrical connection, the ignition arrangement 42 is in electrical connection with a sensor arranged at the vehicle chassis, which is activated, for example, in case of a crash, and which closes a switch of an ignition circuit, whereby the ignition circuit is conducted through the device according to FIGS. 1-4, i.e. the current flows through the chassis-fixed and rotatable contact elements and through the rolling bodies 31. Here, for example, the contact element 15, the rolling body 31 and the contact element 25 can serve as the electrical supply line, and the contact element 16, rolling body 31 and contact element 26 can serve as the electrical return line. With the closing of the ignition current circuit, the pyrotechnical charge is ignited, and the air bag 39 is instantly inflated, pushing apart the cover shells 40 and 40'.

In the embodiment according to FIGS. 1-4, the rolling bodies 31 are tensioned radially with respect to the rubbing contact tracks. In the embodiments according to FIGS. 6, 7 and 8, the rolling bodies 31 are tensioned axially in relation to the steering shaft axis against the respective contact elements. Similar to the previously described embodiments, here also a disc-shaped housing is formed by a support-plate 43, or 43' attached to the steering shaft 1, and an annular cover plate 44 or 44'. The cover rings again extend into annular recesses 45, 45' of the support plate, and are retained by a snap-connection, in such a manner that these parts can be rotated relative to each other. In the embodiment according to FIGS. 6 and 8, the support plate 43 carries ring-shaped contact elements 45" and 46" of different diameters with rubbing contact tracks 45" and 46" which are concave in the axial direction, while the cover ring 44 is provided with corresponding counter-contact elements 47 and 48 with corresponding rubbing contact tracks. Again, all contact elements have electrical connection elements, which in the case of the cover ring 44 are conducted through insulating and sealing bushings 49. A spring- or pressure element 50 has a ring-shape, and consists of a rubber-like elastic, electrically non-conducting material. By means of the spring- or pressure element, the contact elements 47 and 48 are both pressed against the associated rolling bodies 31, and the contact elements 45" and 46", which means they are continuously braced against them. The rolling bodies 31 are also made in the form of balls which are retained in axialball cages 51 and 52 of different diameters.

Figure 6:
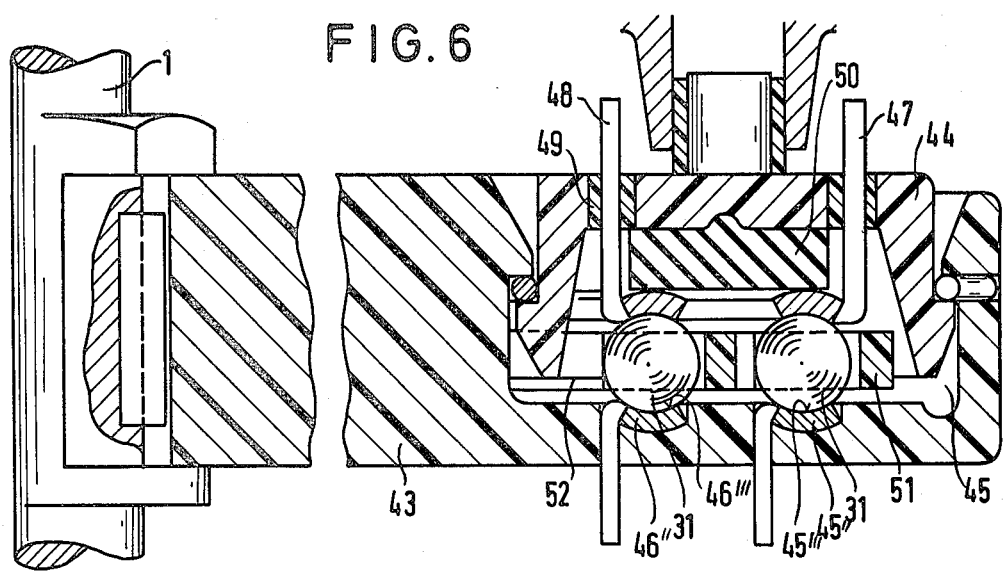
FIG. 6 is a partial sectional view of a device according to the invention with axial-preload of the rolling elements secured to the steering shaft of a motor vehicle.
Figure 7:
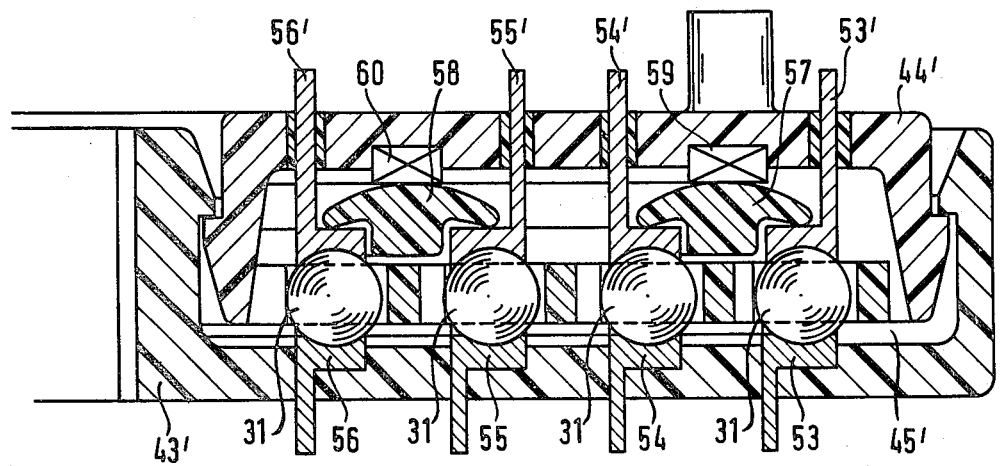
FIG. 7 is another embodiment form of the device according to the invention, constructed according to the principle of FIG. 6.

In contrast to the embodiment according to FIGS. 6 and 8, wherein the device has electrical terminals for one supply- and return line, the device according to FIG. 7 has two pairs of supply and return lines, which are formed by four ring-shaped contact element pairs 53, 53', 54 and 54', and 55 and 55', 56 and 56'. One annular pressure element 57 and 58 of different diameter is provided for each of the two contact-element pairs.

The pressure elements 57, 58 have a mushroom-like profile and consist of an insulating material. Each pressure element 57 and 58 is associated with a spring element 59, respectively 60, which functions to continously tension the contact-element pairs by the pressure elements 57, 58 against the rolling bodies 31 which are arranged between them.

I claim:

1. An apparatus comprising a housing having a movable section and a stationary section, a first circular contact ring formed of an electrically conductive material and connected to said movable section of said housing, a second circular contact ring formed of an electrically conductive material and connected to said stationary section of said housing, and a series of rotatable bodies disposed in an annular array between said first and second contact rings and formed of an electrically conductive material, one of said contact rings being resiliently deflected to a noncircular configuration by engagement with said rotatable bodies to enable said one contact ring to continuously press said rotatable bodies against the other contact ring with a force which is substantially constant throughout the extent of the annular array of rotatable bodies.

2. An apparatus comprising a housing having a movable section and a stationary section, a first pair of contact rings, said first pair of contact rings including a first contact ring formed of an electrically conductive material and connected to said movable section of said housing and a second contact ring which is formed of an electrically conductive material and is connected to said stationary section of said housing, a first series of rotatable bodies disposed in an annular array between said first and second contact rings and formed of an electrically conductive material, a second pair of contact rings disposed radially outwardly of said first pair of contact rings, said second pair of contact rings including a third contact ring which is formed of an electrically conductive material and is connected to said movable section of said housing and a fourth contact ring which is formed of an electrically conductive material and is connected to said stationary section of said housing, a second series of rotatable bodies disposed in an annular array between said third and fourth contact rings and formed of an electrically conductive material, and spring means disposed in engagement with and radially spanning a space between one of the contact rings of said first pair of contact rings and one of the contact rings of said second pair of contact rings to continuously urge said one contact ring of each pair of contact rings axially toward the other contact ring with a force which is substantially constant throughout the extent of the first and second arrays of rotatable bodies.

3. An apparatus as set forth in claim 2 wherein said spring means includes an annular body of resiliently deflectable and electrically insulating material which is disposed in abutting engagement with said one contact ring of each of said pairs of contact rings.

4. An apparatus as set forth in claim 2 wherein said spring means includes a rigid annular body of electrically insulating material which is disposed in abutting engagement with said one contact ring of each of said pairs of contact rings and a spring which presses said annular body of electrically insulating material against said one contact ring of each of said pairs of contact rings.

* * * * *